Figure 1:
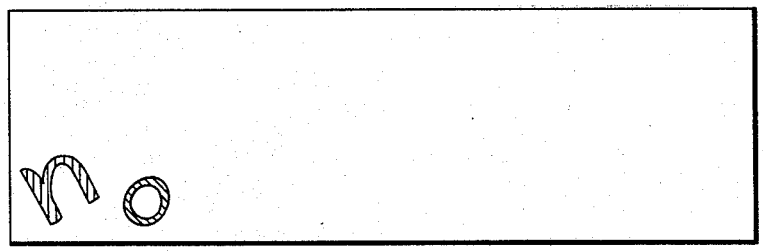

INVENTOR.
JANKO P. KOVACEVICH
BY

ATTORNEY

Feb. 23, 1965  J. P. KOVACEVICH  3,170,247
INSTRUCTIONAL READING MATERIAL
Original Filed Aug. 11, 1959  3 Sheets-Sheet 3

INVENTOR.
JANKO P. KOVACEVICH
BY
ATTORNEY

United States Patent Office 3,170,247
Patented Feb. 23, 1965

3,170,247
INSTRUCTIONAL READING MATERIAL
Janko P. Kovacevich, R.D. 2, Box 118, Medina, Ohio
Continuation of abandoned application Ser. No. 833,000, Aug. 11, 1959. This application Nov. 21, 1960, Ser. No. 70,903
4 Claims. (Cl. 35—35)

This invention relates to instructional reading material, e.g. flash cards, reading cards, readers, etc. The invention is designed primarily for teaching slow learners, immature children with normal intelligence, neurologic children and children with visual motor perceptual difficulty. The invention includes the novel reading matter and its use.

Perception occurs through our senses. These perceptions when organized into a meaningful manner become a concept. It is an accepted theory that once a concept is established it is relatively permanent. It is also accepted that with slow learners, immature children with normal intelligence, neurologic children, and children with visual motor perceptual difficulty, teaching must be rigidly structured. Some of the errors in perception observed in these children are: (1) the inability to visually discriminate similar letters, e.g., d, b; (2) inability to organize letters in spatial sequence, e.g., stop, spot; (3) reversals of words, e.g., saw for was; (4) confusion resulting from general formation of words, e.g. and, said, and (5) undue attention to prominent detail, e.g., again, bought. Because of the physio-neurological implications, growth gradients, and the difficulty these youngsters have with visual motor perceptions, the technique disclosed herein attacks the problem from a perceptual viewpoint and is structured to establish concepts to compensate for these errors in perceptions.

These principles or concepts include spelling words in colored letters, using letters of different sizes and types, and placing the letters at different angles and not in a horizontal straight line, whether in spelling a single word or using the words in a sentence. It is particularly helpful in words of more than two letters, to use letters of different colors with the terminal letters of the same color. Where colored letters are used, they should be bold colors, and the background is preferably a pastel color. (White is not considered to be a color, except with reference to the background.)

The invention relates to instructional reading matter embodying one or more such principles.

Although it is desirable that adjacent letters be of different colors throughout the words, this is not necessary and, for instance, two or more adjacent letters may be the same color. Using letters all of the same color, one or more of the other principles are employed to advantage.

The position of the letters is important. They are arranged in the proper order from left to right, but in a topsy-turvy fashion, meaning only that they give a confused impression—not that any letter is upside down. Thus, adjacent letters may be at different angles. Preferably no more than two adjacent letters are in a horizontal straight line. Letters of different types and sizes may be used adjacent to one another. Thus a capital letter may be adjacent a small letter in the middle of a word, or one letter may be in roman type and an adjacent letter in italic or some other type. Also, in flash cards it has been found helpful to place short words of two to four letters, for example, off center. By a flash card, reference is had to any means of momentarily presenting one or more words to the attention of one or more viewers, whether or not that means includes one or more movable parts or even the flashing of the subject matter on a screen such as a television screen, etc., the important feature of the flash card being the presentation of the reading material for a brief period, not more than a few seconds.

Any one of the foregoing deviations from the usual orderly manner of spelling may be employed alone, or two or more may be utilized together.

These different principles are illustrated in the accompanying drawings which are illustrative only. In the drawings—

Figure 9:
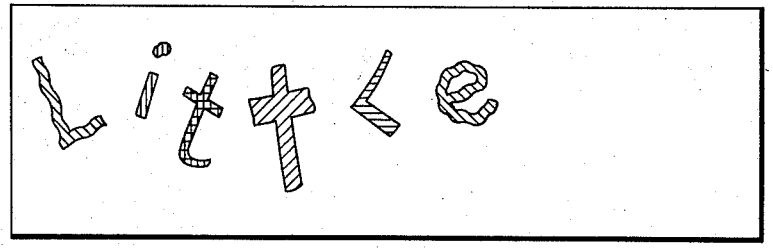
Figure 10:
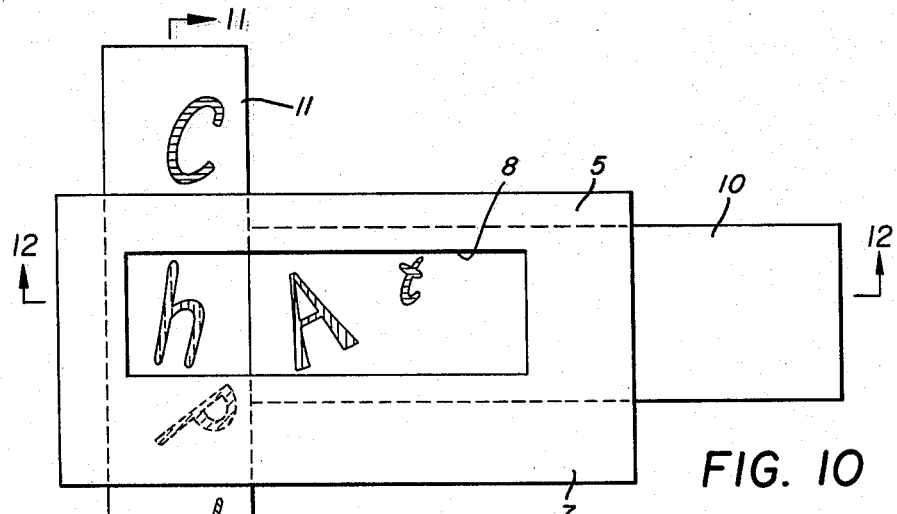
Figure 11:
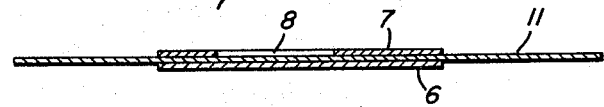
Figure 12:
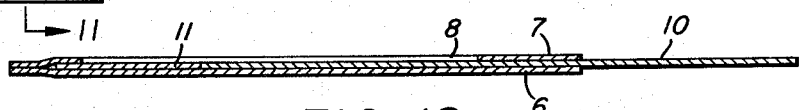

FIGS. 1 through 9 represent a set of flash cards; and
FIG. 10 is a top view of a reading card with slides;
FIG. 11 is a section on the line 11—11 of FIG. 10;
FIG. 12 is a section on the line 12—12 of FIG. 11; and
FIG. 13 is an opened reader.

Figure 2:
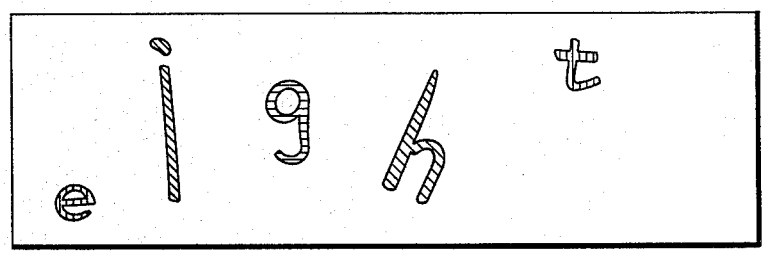
Figure 3:
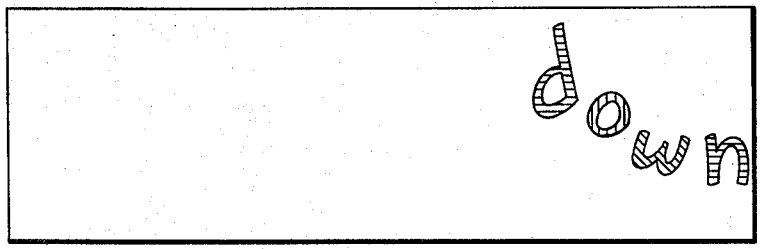
Figure 4:
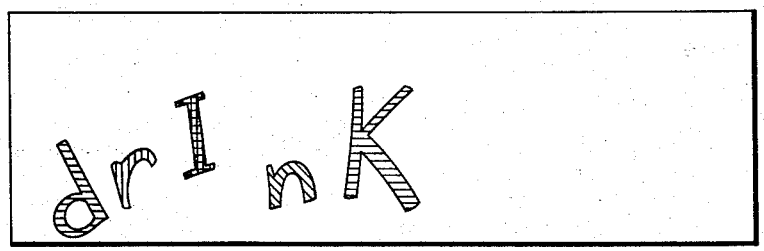
Figure 5:
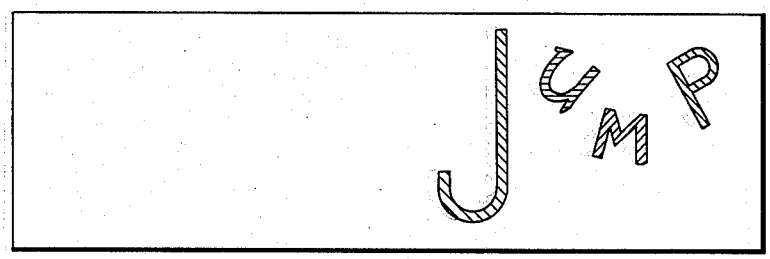
Figure 6:
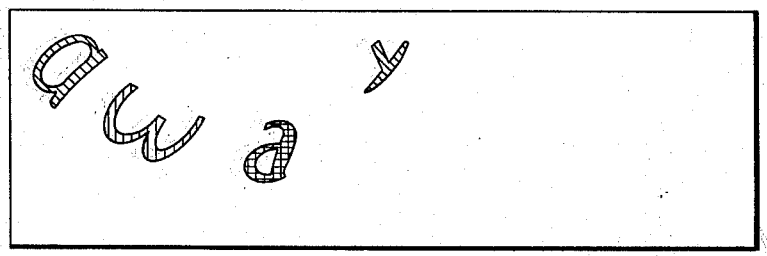

In the flash cards, the letters are shaded to represent different colors, according to the code adopted for patent drawings. Thus, in FIGURE 1 the N is red and the O is green. In FIGURE 2 the first and last letters are red, the second and fourth letters are green, and the middle letter is blue. In FIGURE 4 the I is cross hatched to indicate black. In FIGURE 5 the M is brown.

Figure 13:
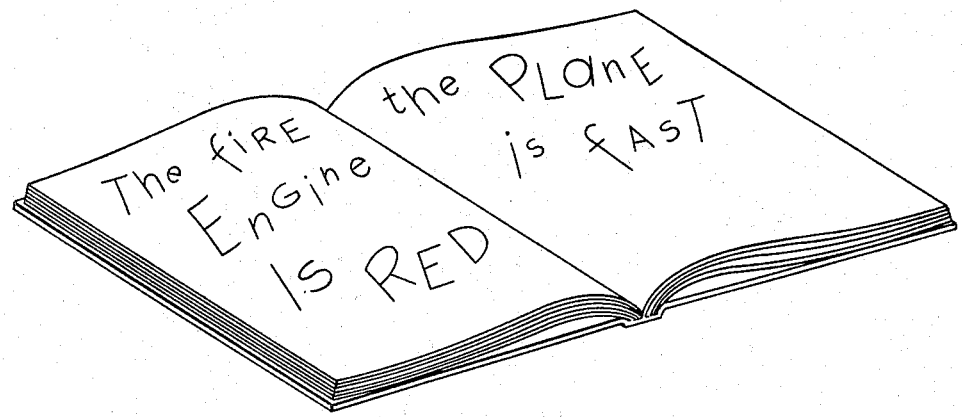

In FIGURE 13 color shading is not used, but it is to be understood that different colors, etc. are to be used, as illustrated in the flash cards.

The background of the flash cards, and the pages of the reader are preferably a pastel color or white.

All of the figures from FIGURE 2 through FIGURE 9 illustrate the principle of having the first and last letters of words of more than two letters, the same color, with adjacent letters between them of different colors.

FIGURES 2 through 9 also illustrate the principle of not having more than two adjacent letters in a straight line.

FIGURES 1, 3, 5 and 8 show short words, off center.

The different flash cards illustrate the principle of having the letters at different angles as, for example, in FIGURE 9 where the two T's slant upwardly toward one another, and the second T and the adjacent L slant away from one another.

Figure 7:
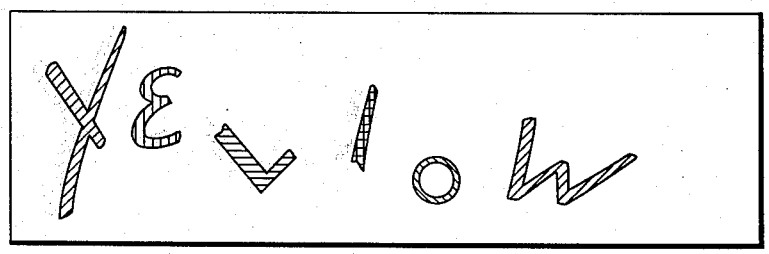
Figure 8:
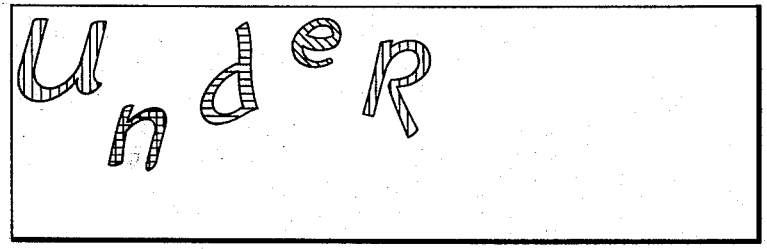

The principle of using letters of different types is well illustrated in FIGURE 7 where the two L's are different, and in FIGURE 9 where only the first and last letters are in wavy lines.

The principle of having the letters of different sizes is well illustrated in FIGURE 2 where the E and I are of very different sizes.

FIGURES 10–12 illustrate a reading card with which different words can be spelled from the letters on the two slides. The frame 5 is made of a back 6 and front 7 with a window 8. The front and back are cemented together except where the longitudinal slide 10 is moved longitudinally and the lateral slide 11 is moved laterally. The slide 10 contains the terminal letters "at" to be used in the making of words, and the initial letters "c," "h," "p," "b" and "f" are on the lateral slide. After the longitudinal card is in position, the lateral card is moved in stepwise fashion to spell out the different words. The slide 10 can be replaced by a slide with other terminal letters, and the slide 11 can be replaced by a slide with different initial letters.

Similarly, the slides might be reversed, as by viewing the card from the top of the drawing. Then a single initial letter will be on the longitudinal slide which replaces the slide 10, such as, for example, the letter "b." Then the lateral slide will carry a common terminal letter combination, such as the letters "an," "it," "oy," "ear," "ee," etc. These slides will be replaceable. They are preferably of cardboard, but may be of sheet metal, thin wood, plastic, etc.

By moving the lateral slide 11, different words are spelled out. Learning is facilitated by utilizing the principles discussed above, as by using differently colored letters, letters of different sizes, etc.

In the reader of FIGURE 13, the sentences on the opposite pages are formed of words which adopt the principles explained. Thus the different letters are of different colors (although too small to show this), and the first and last letters of words of more than two letters are presumed to be the same color. Different types of letters are used with letters of different sizes, and no more than two letters in any one word are on the same line; the letters are at different angles.

Although in each of the figures the background may be white, it is preferably of a pastel color. Thus the background of all of the flash cards may be a light pink. The color of the pages of the reader may be pink, or it may be light blue or any other pastel color. The colors of the letters form a sharp contrast with these background colors.

This application is a continuation of my application Serial No. 833,000 now abandoned filed August 11, 1959.

The invention is disclosed in the claims which follow.

What I claim is:

1. Instructional reading matter consisting of a set of display means arranged as a unit with parallelly oriented faces,
   each of some of said display means having thereon different words of at least three letters with the letters in a generally upright position and correctly arranged from left to right but in a generally confused pattern different from the pattern on other display means of the set,
   with the next adjacent letters of different colors and with the terminal letters the same color.

2. A flash card for instructional reading comprising: a background surface area having at least one reference edge,
   a plurality of at least three discrete areas of colored material surrounded by said background surface area,
   most of said discrete areas having an over-all size different from the discrete areas next adjacent thereto,
   each of said discrete areas having a color different from the discrete areas next adjacent thereto with the most remote two of said discrete areas having the same color,
   each of said discrete areas having an outline the shape of a letter,
   most of said discrete areas being oriented with resepct to said edge at an angle different from the angle of orientation of the areas next adjacent thereto,
   and most of said discrete areas being spaced from said edge by a distance different from the distance of said edge of letters next adjacent thereto,
   whereby the plurality of discrete areas outline a plurality of letters which define a word.

3. The flash card of claim 2 in which the word is offset from the center of the card toward an edge thereof.

4. The method of teaching a learner to visually discriminate similar letters and organize letters in spatial sequence, giving due attention to prominent detail, which method comprises:
   momentarily exposing to the sight of the learner a card from a set of cards each having thereon a word of at least three letters
   with the letters in a generally upright position and correctly arranged from left to right but in a generally confused pattern,
   each letter being of a different color from the next adjacent letters,
   the two most remote letters being of the same color, and by such exposure presenting said word structure to the learner,
   and repeating said step until each card in the set has been so exposed, the confused pattern on each card being different from that on adjacent cards.

References Cited by the Examiner

UNITED STATES PATENTS

| | | | |
|---|---|---|---|
| 340,837 | 4/86 | Walker | 283—46 |
| 373,791 | 11/87 | Worthington | 101—426 |
| 683,267 | 9/01 | Froehlich | 35—35.9 |
| 1,224,742 | 5/17 | Hillyer | 35—35.8 X |
| 1,285,038 | 11/18 | Chance | 35—35.8 X |
| 1,456,834 | 5/23 | Sheffield | 283—46 |
| 1,555,889 | 10/25 | Staunton | 101—426 |
| 1,732,980 | 10/29 | Mooney | 35—35.9 X |
| 2,361,154 | 10/44 | Schoolfield | 35—35.84 |
| 2,809,443 | 10/57 | Hospodar | 35—31.4 X |
| 2,824,389 | 2/58 | Orebaugh | 35—35 |

FOREIGN PATENTS 662,863  3/29  France.

JEROME SCHNALL, Primary Examiner.

P. ARNOLD, L. SMILOW, Examiners.